March 1, 1966  K. E. HUMBERT, JR  3,237,769
FILTER APPARATUS
Filed Feb. 12, 1963
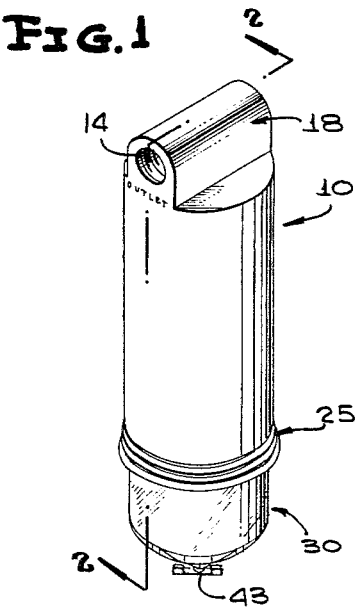
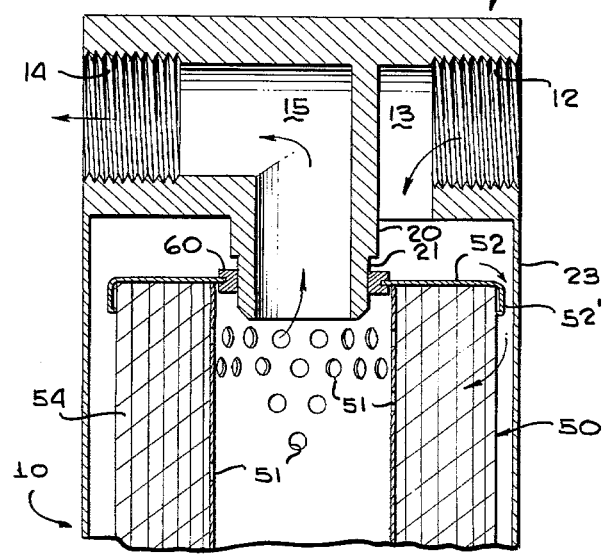
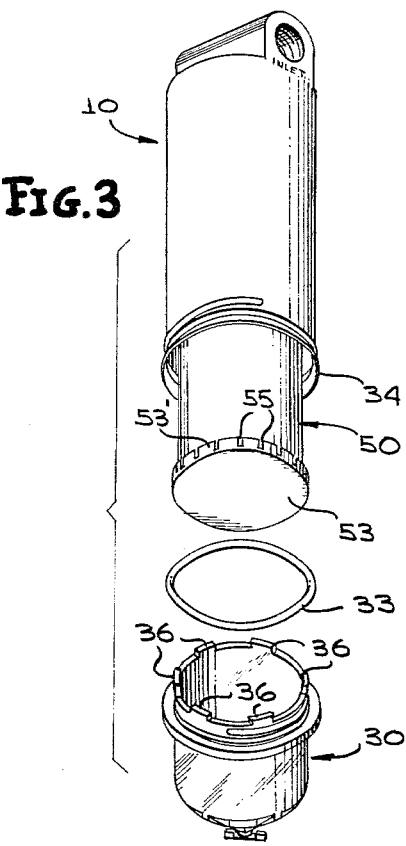
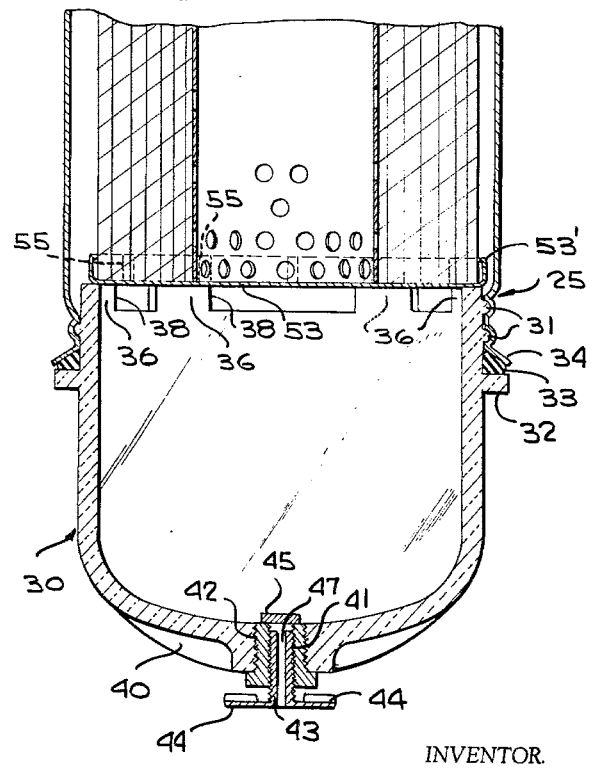
INVENTOR.
KINGSLEY E. HUMBERT, JR.
BY
ATTORNEYS

United States Patent Office 3,237,769
Patented Mar. 1, 1966

3,237,769
FILTER APPARATUS
Kingsley E. Humbert, Jr., Gastonia, N.C., assignor to Wix Corporation, Gastonia, N.C., a corporation of North Carolina
Filed Feb. 12, 1963, Ser. No. 257,983
4 Claims. (Cl. 210—94)

The present invention relates to new and novel filter apparatus, and more particularly to the type of filter apparatus incorporating a replaceable cartridge filter means.

The present invention relates to an in-line filter incorporating a transparent sediment bowl for use with storage tanks for gas and fuel oils and the like wherein the filter means may be disposed in such a position that the sediment bowl is readily visible. This transparent sediment bowl permits visible inspection of the filter means from time to time to determine the point at which not only the sediment bowl should be drained occasionally, but in addition it enables one to determine propitious time for changing the replaceable cartridge within the body means of the device.

Devices for similar purposes have been designed in a number of different manners in the prior art, most of these arrangements incorporating a relatively large number of and sometimes rather complex and bulky parts. It is accordingly a primary objective of the present invention to provide an effective apparatus as discussed above which comprises a minimum of major components and which especially eliminates the long screw which is normally employed with replaceable cartridge type of filters for retaining the components in assembled relationship.

The construction of the filter apparatus according to the present invention is such that it in fact incorporates only three major components, namely, a body means, a replaceable or removable type filter means or cartridge, and a transparent sediment bowl means. Considering firstly the body means of the present invention, this body means is of a novel construction in that it may comprise a single one-piece unitary member which may be formed by an impact extrusion process. By employing a body means formed as an aluminum impact extrusion, the number of steps involved in forming the body means is reduced to a minimum since it is only required that holes be drilled and tapped through the upper portions thereof to provide the inlet and outlet means, and that the outermost end portion of the outer wall portion of the body means be rolled to provide threaded portions thereon. This reduces the manufacturing cost of the body means to a minimum.

The filter cartridge employed in the present invention is of a relatively conventional construction which is desirable since it is not necessary to radically redesign the filter cartridge itself. It is merely necessary to provide a means in the filter cartridge for sealing it at one portion with respect to the body means and to provide an end wall portion with lip means thereon as will be hereinafter more fully described at the opposite end of the cartridge.

The sediment bowl means may itself be of a very simple construction incorporating a drain means at the lower end thereof and having an integral annular shoulder which is adapted to compress a sealing gasket between the shoulder and a portion of the outer wall portion of the body means for providing a liquid tight seal therewith.

The upper edge portion of the sediment bowl means is also provided with lugs which serve to support the filter cartridge in position and to provide spaces therebetween through which liquid may flow from the interior of the body means into the sediment bowl.

It is an object of the present invention to provide new and novel filter apparatus of the replaceable cartridge type which is adapted to be employed with liquid storage tanks.

Another object of the invention is the provision of filter apparatus incorporating means for providing a visible indication of the amount of sediment which has collected in the filter apparatus so as to indicate when it is necessary to drain the apparatus, and furthermore when it will be desirable to remove and replace the filter cartridge.

A further object of the invention is to provide filter apparatus which comprises a minimum of major components and which eliminates the long screw normally employed with replaceable cartridge type filters for holding the components in operative relationship with respect to one another.

A still further object of the invention is the provision of filter apparatus which is quite simple and inexpensive in construction, and yet which is sturdy, efficient and reliable in use.

Other objects and many attendant advantages of the invention will become more apparent when considered in connection with the specification and accompanying drawing, wherein:

FIG. 1 is a top perspective view of filter apparatus according to the present invention;

FIG. 2 is a vertical section through the apparatus shown in FIG. 1, and taken substantially along line 2—2 of FIG. 1 looking in the direction of the arrows; and FIG. 3 is an exploded perspective view illustrating the components of the filter apparatus according to the present invention and their interrelationship with one another.

Referring now to the drawings wherein like reference characters designate corresponding parts throughout the several views, the body means of the present invention is illustrated generally by reference numeral 10, and as discussed previously comprises an aluminum impact extrusion. It is evident that other materials other than aluminum may be employed if desired, although this particular material is considered preferable.

A first hole 12 is drilled and tapped through the upper portion of the extrusion into communication with a rectangular cavity 13 formed in the extrusion upon manufacture thereof. Opening 12 provides the inlet means of the present invention. A similar opening 14 which provides the outlet means of the body means is drilled and tapped and is in communication with the center cavity 15 formed during manufacture of the impact extrusion. It will be noted that the upper portion of the extrusion as indicated by reference numeral 18 in FIG. 1 is an elongated portion of substantially U-shaped cross-sectional configuration. It will be understood that the shape of the upper portion of the extrusion may be varied in many aspects, and the shape thereof is in no sense critical. As a practical matter, the top portion of the extrusion may be modified so as to provide a dome-shaped configuration which may facilitate the extrusion of the body means. In addition, reinforcing ribs extending normally from the side walls of the upper portion 18 may be provided for additional strength as desired.

The body means 10 also includes a central depending tubular portion having a first portion 20 of a particular outer diameter and a second portion 21 of a reduced outer diameter. The body means also includes an outer substantially cylindrical wall portion 23 which extends a considerable distance from the top portion 18 thereof and which is rolled at the outer end thereof so as to provide a threaded portion indicated by reference numeral 25. In a typical example, these rolled threads may have a .200 pitch with a maximum of two turns.

The sediment bowl means 30 is of a transparent material and may be for example formed of glass, plastic or similar material. The requirements for use of the apparatus are such that the sediment bowl means should be of a construction so as to expand 100 p.s.i. internal pressure without leaks and should be able to withstand sudden pressure drops of 100° F. from a maximum of 180° F. The material of the transparent bowl means should also be such that it will remain transparent for two years in an outdoor environment where it is subjected to normal weather conditions. Furthermore, the material should be such that it is unaffected by gasoline and diesel fuel.

The upper portion of the sediment bowl means as seen in FIG. 2 for example is provided with an integral threaded portion 31 which is adapted to cooperate with the threaded portion 25 of the outer wall of the body means whereby the sediment bowl means and body means may be connected in interengaging relationship as illustrated in the drawing. The sediment bowl means is also provided with an integral circumferentially or peripherally extending shoulder 32 which extends outwardly thereof. A conventional O-ring gasket 33 is adapted to be supported on shoulder 32 between the shoulder and an outwardly flaring flange portion 34 at the outer end of wall portion 23 of the body means. It is apparent that when the sediment bowl means 30 is threaded into operative position as shown, the sealing gasket 33 will be compressed so as to provide a liquid tight seal between the sediment bowl means and the body means of the invention.

The upper end edge portion of the sediment bowl means is provided with a plurality of spaced lugs 36 illustrated as six in number, these lugs defining spaces 38 therebetween for a purpose that will be hereinafter described.

The lower portion of the sediment bowl means as seen in FIG. 2 provided with radial ribs 40 for reinforcing this portion thereof, and these radial ribs may be for example six in number spaced at 60° angles with respect to one another. The bottom portion of the sediment bowl means is provided with a central opening 41 which is threaded and which receives therein a plug member 42 which is correspondingly threaded. Plug member 42 is provided with a central threaded opening which receives a movable member 43 the step of which is provided with threads on the outer surface thereof for cooperating with the central threaded opening formed through member 42. The lower end of member 43 is provided with wing-like portions 44 for facilitating manual operation of the movable member, and the upper end thereof is provided with a head portion 45 which is adapted to seat on the upper face of member 42.

A bore 47 is formed through the central portion of member 43, and it will be apparent that upon threading member 43 upwardly, the head portion 45 thereof will be moved out of contact with member 42 so as to expose the bore 47 through member 43 whereby material may be drained from the lower portion of the sediment bowl means.

The removable filter cartridge is indicated generally by reference numeral 50 and includes a central rigid tubular perforated member 51 which extends between an upper end wall portion 52 and a lower end wall portion 53. Members 51, 52 and 53 may be of metallic construction as is conventional in the art. A filter element 54 is provided, this filter element being disposed in annular relationship around the outer periphery of member 51 and extending between the upper and lower end wall portions of the cartridge. Member 54 may comprise silicone treated paper which is pleated in a conventional manner.

It will be noted that end wall portions 52 and 53 are provided with integral lip portions 52' and 53' which serve to encompass the adjacent end portions of filter element 54 for retaining the filter element in operative position. Lip portion 53' is provided with a plurality of spaced slots 55 which extend downwardly to the bottom wall portion 53 as will be most clearly seen in FIG. 2.

The lower end wall portion 53 is solid throughout its extent with of course exceptions of the slots 55 formed in the lip portion 53' thereof. On the other hand, the upper end wall portion 52 is provided with a central circular aperture within which is disposed and retained a gasket 60 which provides a seal with the outer diameter 21 of the central depending tubular portion of the body means.

Liquid flow through the in-line filter apparatus of the invention is indicated by the arrows, and it will be apparent that liquid enters through the inlet 12, thence downwardly within the cavity within the body means and around upper end wall portion 52 of the filter cartridge. Liquid will then pass inwardly through the pleated paper filter element 54 and thence to the perforations 51' provided through the central tubular member 51 of the filter element. The liquid then passes upwardly through cavity 15 and out through the outlet means 14.

It is apparent that the filter apparatus of the present invention incorporates only three major components, namely, the body means 10, the transparent sediment bowl means 30, and the removable filter cartridge 50. It will be noted that the sediment bowl means serves not only as a transparent indication of the amount of sediment which has accumulated therein, but further serves the functions of retaining the removable filter cartridge in operative position within the body means, and further serves to ensure that an effective fluid-tight seal is provided with the body means by compressing gasket 33 in the manner aforedescribed.

In operation of the apparatus, the slots 55 provided in lip portion 53' of the filter cartridge and the spaces 38 defined between lugs 36 of the sediment bowl means permit the filtered liquid to pass downwardly to the sediment bowl means and further ensures that sediment will not collect in the lower portion of the filter cartridge. It is apparent that the sediment bowl means may be drained in a most simple manner simply by operating the movable drain member 43.

It is obvious that when it is desired to replace one of the filter cartridges, it is simply necessary to unscrew the sediment bowl means 30 whereupon the filter cartridge may be readily pulled out of the cavity within the body means. Another filter cartridge may then be inserted in operative position and the sediment bowl means again screwed into the position as seen in FIG. 2, whereupon the parts will again be operatively positioned. It is evident that this procedure is much simpler than that required where a long bolt is necessary for retaining the components of the filter apparatus in operative position as has been a common practice in the prior art.

It is apparent from the foregoing that there is provided a new and novel filter apparatus of the replaceable cartridge type which is adapted to be employed with liquid storage tanks and which incorporate a means in the form of a transparent sediment bowl for providing a visible indication of when the bowl should be drained, and further when it may be desired to replace the filter cartridge within the apparatus. The filter apparatus of the present invention comprises a minimum of major components and in fact only incorporates three principal components. This arrangement completely eliminates the necessity of providing an elongated screw which has normally been employed in the prior art with replaceable cartridge type filters for holding the components in operative position. It is apparent that the construction of the present invention is quite simple and inexpensive, and yet at the same time it is sturdy and further is efficient and reliable in use.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. An in-line filter apparatus comprising a body having a head portion with inlet and outlet means therein, a central flange extending from the head portion having an opening therein leading to the outlet means, and an elongated outer wall extending from the head portion a greater extent than the central flange and having a free end, a transparent sediment bowl, the bowl being transparent substantially throughout the surface thereof, the bowl having an upper portion, cooperating means on the inner surface of the free end of the outer wall and the outer surface of the upper portion of the bowl to connect the same together, sealing means in the connection, a filter element in the body, the filter element comprising a filter media, a central foraminous tube within the filter media and end caps on the filter media, one of the end caps having an opening therein sealingly engaging the central flange, the other end cap being of solid construction and having an upstanding flange thereon engaging the end portion of the filter media, the flange having spaced slots therein, the outer wall being of a length greater than the filter element and being spaced from the filter element to provide a flow area for the substance being filtered, the sediment bowl having a rim portion on the upper portion and comprising spaced lugs thereon providing spaced openings therebetween, the solid end cap engaging the lugs so as to maintain the filter element in sealing engagement with the central flange and spaced from the outer wall when the cooperating means is in engagement, the slots providing flow passages to the substance being filtered to wash any contaminants from the end of the filter media and the openings between the lugs providing flow passages for the substance being filtered and any contaminants therein can be carried into the sediment bowl.

2. The filter apparatus as described in claim 1, wherein the cooperating means comprises threads formed in the free end of the outer wall, and threads formed on the outer surface of the upper portion of the bowl, an outwardly extending flange on the outer wall of the bowl adjacent the upper portion thereof and a sealing ring on the flange engaged by the free end of the outer wall of the body.

3. The filter apparatus as described in and by claim 1, wherein the sediment bowl has a bottom portion having a drain opening therein and valve means cooperating with the opening, valve operating means within the opening to control the withdrawal of contaminants from the sediment bowl.

4. The filter apparatus as set forth in claim 1, wherein the cooperating means comprises threads formed in the free end of the outer wall, and threads formed on the outer surface of the upper portion of the bowl, an outwardly extending flange on the outer wall of the bowl adjacent the upper portion thereof and a sealing ring on the flange engaged by the free end of the outer wall of the body, and the sediment bowl has a bottom portion having a drain opening therein and valve means cooperating with the opening, valve operating means within the opening to control the withdrawal of contaminants from the sediment bowl.

References Cited by the Examiner

UNITED STATES PATENTS

| | | | |
|---|---|---|---|
| 1,991,644 | 2/1935 | Wolters | 210—312 |
| 2,184,243 | 12/1939 | Belyavin | 210—299 |
| 2,427,733 | 9/1947 | McCann | 210—489 |
| 2,488,921 | 11/1949 | Mathews | 210—94 |
| 2,524,336 | 10/1950 | Vokes | 210—303 |
| 3,105,042 | 9/1963 | Roosa | 210—94 |
| 3,122,501 | 2/1964 | Hultgren | 210—94 |

REUBEN FRIEDMAN, *Primary Examiner.*

HERBERT L. MARTIN, *Examiner.*

D. M. RIESS, R. HALPER, *Assistant Examiners.*